US007664631B2

(12) United States Patent
Sugihara et al.

(10) Patent No.: US 7,664,631 B2
(45) Date of Patent: Feb. 16, 2010

(54) LANGUAGE PROCESSING DEVICE, LANGUAGE PROCESSING METHOD AND LANGUAGE PROCESSING PROGRAM

(75) Inventors: Daigo Sugihara, Kanagawa (JP); Hiroshi Masuichi, Kanagawa (JP); Shunichi Kimura, Kanagawa (JP); Katsuhiko Itonori, Kanagawa (JP); Hideaki Ashikaga, Kanagawa (JP); Hiroki Yoshimura, Kanagawa (JP); Masanori Onda, Kanagawa (JP); Masahiro Kato, Kanagawa (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 11/311,416

(22) Filed: Dec. 20, 2005

(65) Prior Publication Data
US 2006/0206307 A1 Sep. 14, 2006

(30) Foreign Application Priority Data
Mar. 9, 2005 (JP) ............................. 2005-065959

(51) Int. Cl.
*G09B 19/04* (2006.01)
*G06F 17/20* (2006.01)
*G06F 17/27* (2006.01)
*G10L 15/00* (2006.01)
*G10L 17/00* (2006.01)

(52) U.S. Cl. .................... 704/9; 704/231; 704/240; 704/246; 434/185

(58) Field of Classification Search .................... 704/9
See application file for complete search history.

(56) References Cited

U.S. PATENT DOCUMENTS

| 5,774,845 | A  | * | 6/1998 | Ando et al. ................ 704/231 |
| 6,205,456 | B1 | * | 3/2001 | Nakao ....................... 715/201 |
| 2005/0086592 | A1 | * | 4/2005 | Polanyi et al. ............ 715/512 |
| 2005/0143971 | A1 | * | 6/2005 | Burstein et al. ............. 704/4 |

FOREIGN PATENT DOCUMENTS

| JP | A-5-54073 | 3/1993 |
| JP | A-5-108703 | 4/1993 |

(Continued)

OTHER PUBLICATIONS

Kawahara et al., "Improving Japanese Zero Pronoun Resolution by Global Word Sense Disambiguation," Proceedings of the 20th International Conference on Computational Linguistics, pp. 343-349, http://www.kc.t.u-tokyo.ac.jp/~kawahara/paper/COLING2004.pdf., 2004.

(Continued)

*Primary Examiner*—David R Hudspeth
*Assistant Examiner*—Justin W Rider
(74) *Attorney, Agent, or Firm*—Oliff & Berridge, PLC

(57) ABSTRACT

According to an aspect of the present invention, a language processing device has a text input section and an anaphora analysis section. The text input section acquires text data. The anaphora analysis section analyzes whether a correct anaphora relation is included in the text data acquired by the text input section. The correct anaphora relation has an anaphor and an antecedent corresponding to the anaphor.

15 Claims, 1 Drawing Sheet

FOREIGN PATENT DOCUMENTS

| JP | A-7-93333 | 4/1995 |
|---|---|---|
| JP | A-2978044 | 9/1999 |
| JP | A-2002-55977 | 2/2002 |

OTHER PUBLICATIONS

Murata et al., "Pronoun Resolution in Japanese Sentences Using Surface Expressions and Examples,"ACL'99 Workshop on 'Conference and Its Applications', Maryland, USA, http://www2.nict.go.jp/jt/a132/member/murata/ps/acl99_ws_deno.ps.gz, or http://citeseer.ist.psu.edu/murata99pronoun.html, or http://acl.1dc.upenn/W/W99/W99-0206.pdf, Jun. 22, 1999.

Murata et al., "An Estimate of Referents of Pronouns in Japanese Sentences Using Examples and Surface Expressions," *Natural Language Processing*, vol. 2, No. 3, http://www2.nict.go.jp/jt/a132/member/murata/ps/NLP_demo.ps.gz, Jul. 1995.

Nigam et al., "Learning to Classify Text from Labeled and Unlabeled Documents," Proceedings of AAAI-98, 15th Conference of the American Association for Artificial Intelligence, pp. 1-22, http://citeseer.ist.psu.edu/15528.html, 1998.

Witten et al., *Data Mining: Practical Machine Learning Tools and Techniques with Java Implementations*, pp. 188-193, 1999.

\* cited by examiner

LANGUAGE PROCESSING DEVICE, LANGUAGE PROCESSING METHOD AND LANGUAGE PROCESSING PROGRAM

TECHNICAL FIELD

The present invention relates to a device, a method and a program for performing language processing, including translation.

RELATED ART

Several techniques for reading images of a document using a scanner, and for translating a natural language from a scanned image after the image has been converted to text have been proposed.

Conventional techniques have not given due consideration to the problem presented by anaphors when translating only a part of a natural language document. In broad terms, an anaphor can be thought of as an expression occurring in natural language that refers to an antecedent expression in a previous sentence or clause. Thus, the antecedent expression and subsequent replacement expression, the anaphor, are said to have an anaphoric relation. In the sentences "Taro went to a bookstore. He bought a magazine.", the pronoun "He" in the second sentence is an anaphor which refers to the antecedent "Taro". In Japanese, anaphors tend to be omitted. Thus, in Japanese, the above sentence would be expressed as: "Taro went to a bookstore. Bought a magazine". The omitted anaphor is referred to as a zero pronoun. When translating the sentences from Japanese to English, it is important to have an anaphoric relation correctly, which includes an antecedent and an anaphor corresponding to the antecedent. Research into resolving anaphoric relations for performing machine translation of natural language has been conducted. Further, inventions directed to anaphor resolution in machine translation directed to commercial applications, for example, query response tasks, have been proposed. Invention for improving functionality of a translation system by incorporating into the system anaphora analysis which presumes the existence of zero pronouns, is known. Also, several inventions disclose a technique for conducting anaphora analysis.

However, conventional research into anaphora analysis in natural language processing has generally been directed to language forms which have clear beginning and end points, such as news paper articles, extracts of discourse, and the like. Generally, it is not always that a beginning and/or an end point of a source text for translation is made explicit or clear. For example, when part of the document is scanned, information in a scanned text may be fragmented. A beginning point and an end point of the information may not be included in the scanned text, and it will not be clear. Anaphoric relations within the scanned text in the source language may be unclear. Under these circumstances, it becomes difficult to perform anaphoric analysis when processing and translating the text, since an antecedent(s) for an anaphora(s) may be missing from the scanned text.

SUMMARY

According to an aspect of the present invention, a language processing device has a text input section and an anaphora analysis section. The text input section acquires text data. The anaphora analysis section analyzes whether a correct anaphora relation is included in the text data acquired by the text input section. The correct anaphora relation has an anaphor and an antecedent corresponding to the anaphor.

BRIEF DESCRIPTION OF THE DRAWINGS

Embodiments of the present invention will now be described in detail with reference to the following figures, wherein.

DETAILED DESCRIPTION

Figure 1:
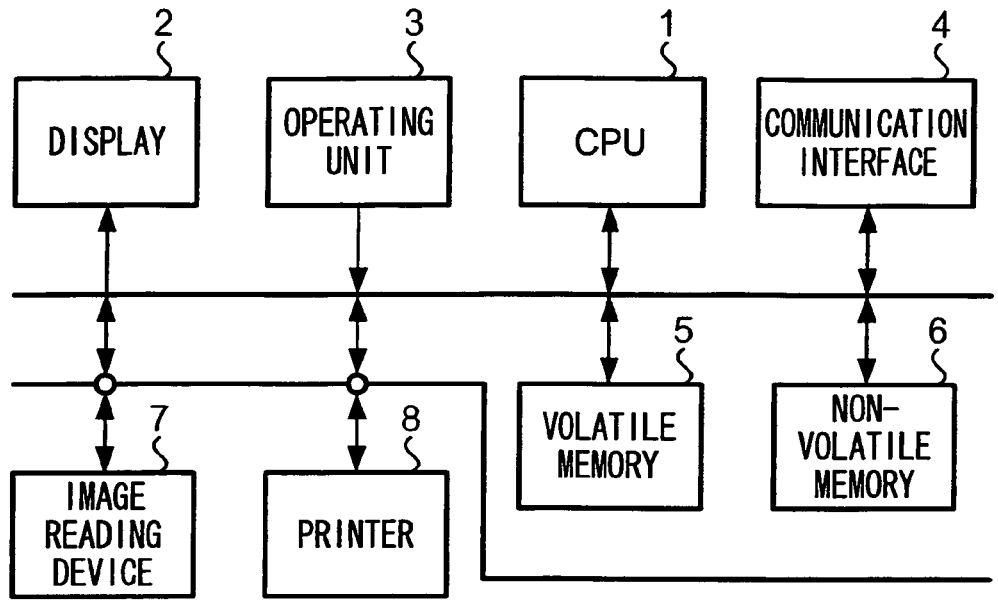
FIG. 1 is a block diagram showing a configuration of a language processing device of one embodiment of the present invention.

An aspect of the present invention will now be described in detail with reference to the accompanying figures. FIG. 1 is a block diagram showing a basic configuration of a language processing device. The language processing device has a language processing program of the present invention used in conjunction with, for example, a personal computer. The device has: a CPU 1, which is used as a control center, a display 2 and an operating unit 3 as a user interface; a communication interface 4 for controlling communication over a network; a volatile memory 5 used as a work area by the CPU 1; and a non-volatile-memory 6 for storing programs run by CPU 1. Furthermore, the language processing program is connected to an input and output means, respectively, such as an image reading device 7 such as a scanner, and to a printer 8.

The language processing program is a main program stored in the nonvolatile-memory 6. The language processing program is a program for performing: anaphora analysis on text data representing sentences; a preprocessing operation for improving a clarity of text data to be translated, by which missing information is added; and a translation operation for translating the clarified text data. In the present embodiment, text data acquired as a result of performing a character recognition process on image data read by the image reading device 7 is stored in the volatile memory 5. The text data stored in the volatile memory 5 may be a processing object of the language processing program. Therefore, the processing object of the language processing program is text data of a sentence in which an anaphora connection to the preceding sentence is not evident. However, performing an anaphora analysis on the text data in which an anaphora connection to the preceding sentence is not evident, a result of the anaphora analysis is not correct. According to an aspect of the present invention, the language processing program is a mechanism for preventing an incorrect analysis which is likely to occur at the time of performing an anaphora analysis. Hereinafter, before explaining the contents of a language processing program, the problems involved in incorrect analysis of anaphora analysis will be described.

An example of sentences will be below.

<Sentence 1> In the news conference held on 25th, mayor B of city A announced withdrawal of his plan to purchase "site C". The mayor explained the reason for withdrawal stating, "since the site is subject to a debt problem, we should not use public money in this case"

<Sentence 2> In the past, a case existed where the city made a plan for purchase, but then withdrew, and thus apologized stating, "I express my sincere apology to all of citizens for changing the plan twice".

Suppose that the text of sentence 2 is a target of anaphora analysis. In this case, a zero pronoun of a nominative is the word "apologizes" in sentence 2. This zero pronoun in sentence 2 refers to "mayor B" in sentence 1, which is not the object of the anaphora analysis. This zero pronoun should refer to "mayor B" and should not refer to "the city", "a plan for purchase", "a case", "changing" and "citizens" included in sentence 2.

A conventional anaphora analysis technique is likely to provide an incorrect analysis. For example, suppose that anaphora analysis is performed, wherein an antecedent candidate with a zero pronoun of a nominative is given a score in accordance with the rule explained below; and the antecedent candidate with the highest score is selected as the antecedent.

Rule 1: When a zero pronoun of a nominative is included in a sentence, the antecedent candidates of a nominative" are given a score of +10.

Rule 2: When a zero pronoun is included in the sentence, the antecedent candidates included in the sentence to be analyzed are given a score of +10; the antecedent candidates included in one sentence before the sentence to be analyzed are given the score of +5; and the antecedent candidates included in two sentences before the sentence to be analyzed are given a score of +2.

Rule 3: The antecedent candidates " " (quotation marks) such as indicating speech are given a score of –5.

Rule 4: The antecedent candidates satisfying selection criteria for a zero pronoun of a nominative are given a score of +15.

The rules are applied to the antecedent candidates, and the antecedent candidate having the highest score is recognized as the antecedent of the zero pronoun. Rule 1 is based on a general research result that a noun of a nominative is likely to be a case element of a nominative; rule 2 is based on a general research result that an antecedent is most likely located near an anaphor, rule 3 is based on a general research result that nouns within quotation marks " " indicating a part of speech is unlikely to be an antecedent; rule 4 is based on the nature of a language wherein the candidate of the noun that is considered to be a zero pronoun of a nominative is limited. Unpatented document 2 discloses a similar technique.

When the above rules are applied to sentence 2, the scores given to the antecedent candidates "the city", "a plan for purchase", "a case", "changing", "the citizens" are as follows.

"The city": 35 points, "a plan for purchase": 10 points, "a case": 20 points, "changing": 10 points, "the citizens": 10 points.

Consequently, among the antecedent candidates, the antecedent satisfying the criterion for being selected as the antecedent and also included in the sentence containing a zero pronoun; namely, "the city" is recognized as the antecedent of the zero pronoun. However, the result is not correct. There are various systems with means for preventing this misinterpretation by defining a threshold to be assigned to the antecedent candidates to recognize an antecedent. However, the setting of a threshold is generally difficult therefore, a threshold is set manually in conventional techniques. For example, if the point to be assigned to the antecedent candidates of the zero pronoun is set as "greater than 40", "the city" is not selected as the antecedent of "apologizes" because the threshold of the word is lower than the set threshold. When sentence 1 and sentence 2 are input and the threshold is set as "greater than 40", neither "mayor B" (37 points) nor "the mayor" (40 points) which are suitable antecedents of "apologizes" are selected as the antecedent. As such, when an anaphora analysis is not performed correctly, the quality of a translation, namely, the quality of translating a section of a text read by the image reading device 7 is not assured.

An aspect of the present invention, a language processing program has a providing section of text for determining whether a sentence which is an object of an anaphora analysis presents a suitable anaphora analysis result in a case that only one sentence is the object of an analysis, thereby preventing an incorrect anaphora analysis from being performed.

Figure 2:
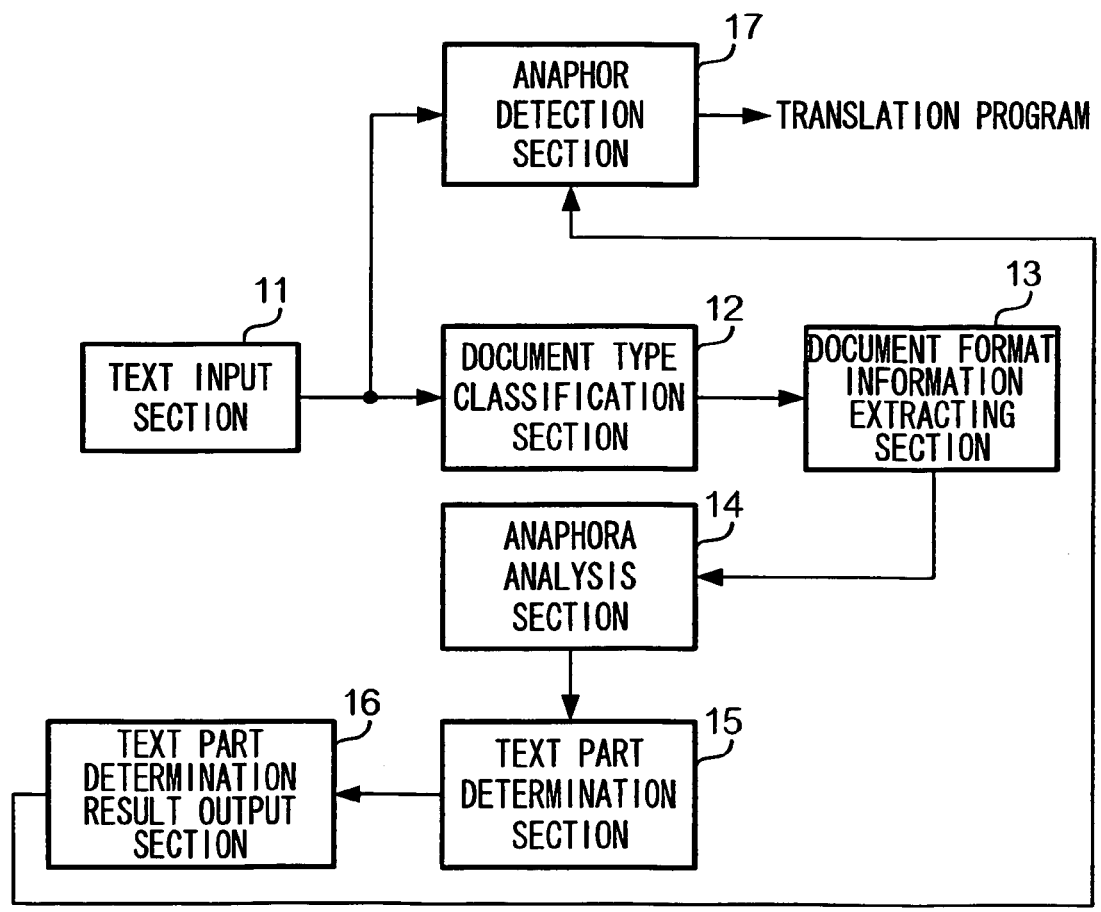
FIG. 2 is a block diagram showing a hardware configuration of the language processing device including a language processing program according to the embodiment shown in FIG. 1.

FIG. 2 is a block diagram of a hardware configuration which shows the contents of a preprocessing function in the language processing program. In the figure, a text input section 11 is a section for acquiring text data which is an object of both preprocessing and translation. A document type classification section 12 classifies the document type of text data acquired by the text input section 11. The document type refers to a classification relative to the form of a document, such as whether a document is a newspaper, a manual, or a patent document. The determination result as to a discontinuity of a sentence and an anaphor phenomenon in a sentence differs depending on the type of a document. Therefore, a language processing program would also determine a document type.

A method relating to document classification may be selected from among various methods from conventional techniques. In the present embodiment, depending on a document type, text data are classified as a newspaper article, a scientific article, a manual, and a patent document. The process of classifying a document is performed using a classification resource drawn from study data using a vector space method.

When receiving a classification result, a document format information extracting section 13 extracts document format information from text data in accordance with a document type extraction rule corresponding to the type of a document. In a patent document, for example, expressions such as "claim 2" or "detailed description of the invention" are extracted by pattern matching as document format information. In an article, chapters such as "Chapter 1" or "2.2", or expressions described independently such as "abstract" or "conclusion" are extracted as document format information in accordance with a rule. The document format information has a beneficial effect in determining whether the input text data includes discontinuity of an anaphora relation from its antecedent in the preceding sentence. For example, in the sentence of an article, when an abstract or a title is included in the head of text data, it is determined that the text data is a sequential set of data starting from the beginning of the title of the chapter, and that there is no discontinuity of anaphora relation from the preceding sentence.

An anaphor detection section 14 performs an anaphor detection process on text data acquired by the text input section 11 and extracts information relating to a pronoun and a zero pronoun and expressions indicating the existence of an anaphora like a demonstrative such as "the city" or "the company" or "this". When applied to the example described above, anaphor detection section 14 detects that the zero pronoun of a nominative is included in the word "apologizes" in sentence 2. The location of the zero pronoun is determined as a main clause of the first sentence. For example, anaphors such as "the city" or "the company" indicate that the name of the city or the company is described in the preceding sentence as an antecedent. When such expressions are included in the first sentence of input text data, it is appropriate to consider that the input text data continues from the previous sentence. If a pronoun, a demonstrative, and a zero pronoun are present at the beginning of a sentence, it is also appropriate to determine that input text data continues from the previous sentence. Therefore, the anaphor detection section 14 detects anaphors having such a feature from input text data and stores the data.

A text part determination section 15 determines whether an anaphora relation of input text data discontinues from a preceding sentence. This determination is performed based on document format information extracted from input text data by the document format information extracting section 13, and anaphors extracted and stored by the anaphor detection section 14 from the input text data. As the text part determination section 15, a binary-value classifier equipped with a learning function such as a support vector machine (SVM) may be employed.

SVM is a machine learning method which is proposed as a framework for a statistic learning theory. To enable SVM to classify whether input text data includes a discontinuity of an anaphora relation, learning data for the classification has to be provided with SVM. In the present embodiment, the learning data is prepared for each type of classified document such as a newspaper or a magazine article, a manual, or a patent document. More specifically, corpus data of each type of document is prepared, and an anaphora analysis process is performed on the corpus data by the existing anaphora analysis technique. Then, learning data is prepared; in which, data containing an anaphora relation between an antecedent and an anaphora is set as a positive example; data with a discontinuous anaphora relation between an antecedent and an anaphora is set as a negative example. The resulting learning data is provided to SVM for reference.

In the present embodiment, it is supposed that text data input by the image reading device 7 breaks its continuity in various ways. The criterion for determining whether the continuity of a sentence is broken is a detection result of document format information and anaphors. SVM learns the pattern of sentence breaks and continuity between various combinations of different pieces of information. For example, in a case that a first sentence of a text starts with an expression such as "the city" or "the day", the sentence is likely to be a part of a continuing sentence, and an expression corresponding to a title is not included in the sentence. In an article, since the sentences sequential text following document format information titled "abstract" completes its description as a whole text, the direct antecedent of a zero pronoun, a demonstrative, or a pronoun is unlikely to appear in the following text body of the article. Even if the contents of the article are given in detail in Chapter 1 of the article, and the description of the abstract and the following chapters are separated into sections, it will not cause a problem in the anaphora analysis. However, the contents described in section 1 and section 2 of Chapter 1 are likely to include an anaphora chain between a zero pronoun, a demonstrative, or a pronoun. The tendency of appearance of document format information or an anaphor in each type of document implies that the discontinuity of an anaphora chain in each document depends on a type of the document. To enable a binary-value classifier to respond to various instructions from a user, a SVM is trained to learn by learning data containing various combinations of document format information and anaphors.

As described above, the text part determination section 15, on the basis of both the detection result of an anaphor and document format information, determines whether input text data continues from the previous sentence. The determination result is output from a text part determination result output section 16.

An anaphora analysis section 17 performs an anaphora analysis on text data acquired by the text input section 11, adds supplemental information necessary for translating the text data, and transfers the data to a translation program. When an anaphor is included in the text data, the anaphora analysis section 17 selects an antecedent corresponding to the anaphor from among the antecedent candidates included in the text data. In the selection, the rule described above is applied to each antecedent candidate so as to determine the point of reference for each antecedent. If any of the points of reference determined for each antecedent candidate is lower than a set threshold value, it is determined that the antecedent is not included in the text data. To proceed with the anaphora analysis, the procedure for avoiding incorrect anaphora analysis such as displaying a message requiring an input of text data preceding the text data is performed.

In the present embodiment, information indicating the determination result of the text part determination section 15 is transferred from the text part determination result output section 16 to the anaphora analysis section 17, and a threshold is controlled. Specifically, when it is determined that the anaphora chain of the text data that is currently a target for an anaphora analysis discontinues, the criteria for recognizing an antecedent candidate by the anaphora analysis at the anaphora analysis section 17 are made stringent. In this way, incorrect anaphora analysis is prevented. For example, in the case where "the city" is recognized unsuitably as an antecedent, suppose that the anaphora analysis section 17 sets the threshold criteria for the points of each antecedent candidate as "greater than 40". In this case, "the city" is less than the set threshold; therefore, "the city" is not selected as an antecedent of "apologizes". The anaphora analysis section 17 determines that it is not possible to identify the zero pronoun of a nominative for "apologizes" and proceeds to the next step.

When the zero pronoun of a nominative is not identified as described above, the anaphora analysis section 17 requires a user to add preceding text data, or add an expression suitable to the zero pronoun of the verb as a temporary precedent of the zero pronoun. Also, according an aspect of the present invention, when the anaphora relation is not correct, the anaphora analysis section adds an expression suitable to an antecedent or an anaphora or a user adds the suitable expression. In the example described above, referring to a case frame dictionary of "apologizes", case elements of a nominative for "apologizes" are determined as "human" or "organization". It is also predetermined that the case elements of either "human" or "organization" is substituted with an expression "somebody". The zero pronoun of a nominative for "apologizes" is supplemented by "somebody". The supplement of the zero pronoun "somebody" is not necessarily a suitable supplement, but it is not an obviously incorrect supplement as "the city"; thus, the supplement is the most suitable answer among the limited input. It is possible to translate a Japanese word 「何者か」into "someone" and also to output the translation result of the input text. When a high threshold is preset, the anaphora analysis section 17 may not select a suitable antecedent candidate as the antecedent. However, in the present embodiment, since a threshold is set depending on each determination result of whether a discontinuity in the anaphora relation exists in the input text data, it is possible to achieve greater flexibility in determining an anaphora analysis result depending on the contents of the text data.

According to an aspect of the embodiment, a supplement of the preceding text data is requested by a user when it is determined that a discontinuity exists in the anaphora relation in the input text data, the possibility of anaphora analysis section 17 performing an incorrect anaphora analysis is reduced. Also, when translating an input text data, it is possible to obtain a high quality translation result.

There are some aspects of the present invention as described below.

In the above-described embodiment, the text part determination section 15 determines the existence of discontinuity of an anaphora relation to the precedent part of text data on the basis of the document format information extracted by the document format information extracting section 13 and the anaphor detected by the anaphor detection section 14; in another embodiment, it is also possible to determine, on the basis of either a document format information or an anaphor, whether a discontinuity exists in the anaphora relation.

In another embodiment, a user selects a part of text as being a translation object in text data. The image of the whole document is read and converted to a text, and the text data is stored in the non-volatile memory 5 and displayed on the display 2, thereby the part selected by the user is enabled through the operation of the operating unit 3. In this embodiment, when a determination result indicates that the discontinuity of an anaphora relation exists in the text data which is a translation object, the range of the text data to which an anaphora analysis is performed may be increased to the range of the text data stored in the volatile memory 5.

The present invention provides a language processing device including a text input section for acquiring text data; a text part determination section for determining whether the text data acquired by said text input section is data indicating that the read sentence is a part of sentence presenting one information; and an anaphora analysis processing section for identifying data indicating an anaphor included in the text data and data indicating an antecedent of the anaphor on the basis of a specific criterion, when the text data is determined by the text part determination section as data indicating that the read sentence is a part of sentence presenting one information; and for identifying data indicating an anaphor included in the text data and data indicating an antecedent of the anaphor on the basis of another criterion except the criterion, when the text data is determined by the text part determination section as data indicating that the read sentence is not a part of sentence presenting one information; and a language processing program causing a computer to perform the above described functions.

As described above, by using the language processing device and the language processing program, in an anaphora analysis, it is possible to switch the criteria for selecting an antecedent candidate corresponding to an anaphor, on the basis of the determination result as to whether text data to be processed has a discontinuity in the anaphora relation between its antecedent.

In other embodiment, the language processing device and the language processing program further includes a document format information extracting means for extracting document format information from the text data acquired by the text input means; wherein, the text part determination means, on the basis of the document format information extracted by the document format information extracting means, determines whether a discontinuity in an anaphora relation is included in the text data.

In an embodiment, the language processing device and the language processing program further includes an anaphor detection means for detecting an anaphor from the text data acquired by the text input means; wherein the text part determination means, on the basis of the anaphor extracted by the anaphor detection means, determines whether a discontinuity in an anaphora relation exists in the text data.

In an embodiment, the language processing device and the language processing program further includes a document format information extracting means for extracting document format information from the text data acquired by the text input means; an anaphor detection means for detecting an anaphor from the text data acquired by the text input means; wherein the text part determination means, on the basis of the document format information extracted by the document format information extracting means and the document format information extracted by the document format information extracting means, determines whether a discontinuity in an anaphora relation exists in the text data.

In an embodiment, the language processing device and the language processing program further includes a document type classification means for extracting the document type of text data acquired by the text input means; wherein, the document format information extracting means extracts document format information from the text data in accordance with a document format information extraction rule corresponding to the type of document determined by the document type classification means from among the document format information extraction rules set for each type of document.

In an embodiment, the language processing device and the language processing program further includes a document type classification means for extracting the document type of text data acquired by the text input means; wherein, the anaphor detection means detects an anaphor from the text data in accordance with an anaphor detection rule corresponding to the type determined by the document type classification means from among the anaphor detection rules set for each type of document.

In an embodiment, the text part determination means is a binary-value classifier which studies from the learning data provided for each type of document, the discontinuity criteria of an anaphora relation, and determines whether a discontinuity of an anaphora relation to the preceding sentence exists in the text data.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments, and with various modifications as are suited to a particular use. It is intended that the scope of the invention be defined by the following claims and their equivalents.

The entire disclosure of Japanese Patent Application No. 2005-65959 filed on Mar. 9, 2005 including specification, claims, drawings and abstract is incorporated herein by reference in its entirety.

What is claimed is:

1. A language processing device comprising:
   i. a text input section that acquires text data;
   ii. an anaphora analysis section that analyzes whether a correct anaphora relation is included in the text data acquired by the text input section;
   iii. a determining section that determines whether the text data is fragmented based on corrections of the anaphora relation; and
   iv. a document format information extracting section that extracts document format information from the text data acquired by the text input section, wherein the anaphora analysis section analyzes whether the correct anaphora relation is included in the acquired text data based on the document format information, when the anaphora analysis section analyzes the anaphora relation and the correct anaphora relation is not included in the text data, the anaphora analysis section adds an expression suitable to an antecedent or an anaphora or a user adds the expression, and the correct anaphora relation has an anaphor and an antecedent corresponding to the anaphor.

2. The language processing device according to claim 1, wherein the anaphora analysis section has a text part determination section, the text part determination section determines whether the text data acquired by the text input section is started from a beginning of a sentence.

3. The language processing device according to claim 2, wherein when the text part determination section determines that the acquired text data is not started from the beginning of a sentence, the anaphora analysis section analyzes that the correct anaphora relation is not included in the acquired text data.

4. The language processing device according to claim 1, wherein when the anaphora analysis analyzes that the correct anaphora relation is not included in the acquired text data, the anaphora analysis determines an antecedent corresponding to an anaphor from another part of text data.

5. The language processing device according to claim 1, wherein the anaphora analysis section has a text part determination section, the text part determination section determines whether the text data acquired by the text input section continues from a previous sentence.

6. The language processing device according to claim 1, further comprising:
an anaphor detection section that detects an anaphor from the text data acquired by the text input section,
wherein the anaphora analysis section analyzes whether the correct anaphora relation is included in the acquired text data based on the anaphor detected by the anaphor detection section.

7. The language processing device according to claim 1, further comprising:
a document format information extracting section that extracts document format information from the text data acquired by said text input section; and
an anaphor detection section that detects an anaphor from the text data acquired by the text input section;
wherein the anaphora analysis section analyzes the correct anaphora relation based on the document format information and the anaphor detected by the anaphor detection section.

8. The language processing device according to claim 6, further comprising:
a document type classification section that extracts a document type of the text data acquired by the text input section,
wherein the anaphor detection section detects an anaphor from the text data based on an anaphor detection rule corresponding to the type of the document.

9. The language processing device according to claim 1, further comprising:
a document type classification section that classifies a document type of the text data acquired by the text input section,
wherein the document format information extracting section extracts document format information from the text data based on a document format information extraction rule corresponding to the type of document.

10. The language processing device according to claim 1, wherein the anaphora analysis section generates a rule for analyzing an anaphora relation based on the type of document.

11. The language processing device according to claim 1, wherein the anaphora analysis section is a binary-value classifier which decides whether the text data discontinues.

12. The language processing device according to claim 1, wherein the anaphora analysis section analyzes the anaphora relation based on a score, each word in the text data having a score.

13. A language processing method comprising:
acquiring text data;
extracting document format information from the text data acquired by the text input section;
analyzing whether a correct anaphora relation is included in the acquired text data based on the document format information;
determining whether the acquired text data is fragmented based on the correctness of the anaphora relation; and
adding an expression suitable to an antecedent or an anaphora when the correct anaphora relation is not included in the text data,
wherein the correct anaphora relation has an anaphor and an antecedent corresponding to the anaphor, and
at least one of the above steps is preformed by a processor.

14. The language processing method according to claim 13, wherein the analyzing is performed based on whether the acquired text data is started from a beginning of a sentence.

15. A storage medium readable by a computer, the storage medium storing a program of instructions executable by the computer to perform a function for processing language, the function comprising:
acquiring text data;
extracting document format information from the text data acquired by the text input section;
analyzing whether a correct anaphora relation is included in the acquired text data based on the document format information;
determining whether the text data is fragmented based on the correctness of the anaphora relation; and
adding an expression suitable to an antecedent or an anaphora when the anaphora analysis section analyzes the anaphora relation and the correct anaphora relation is not included in the text data,
wherein the correct anaphora relation has an anaphor and an antecedent corresponding to the anaphor.

* * * * *